A. KINGSBURY.
VENTILATING MEANS FOR DYNAMO ELECTRIC MACHINES.
APPLICATION FILED JULY 9, 1906.
959,550.
Patented May 31, 1910.
2 SHEETS—SHEET 1.
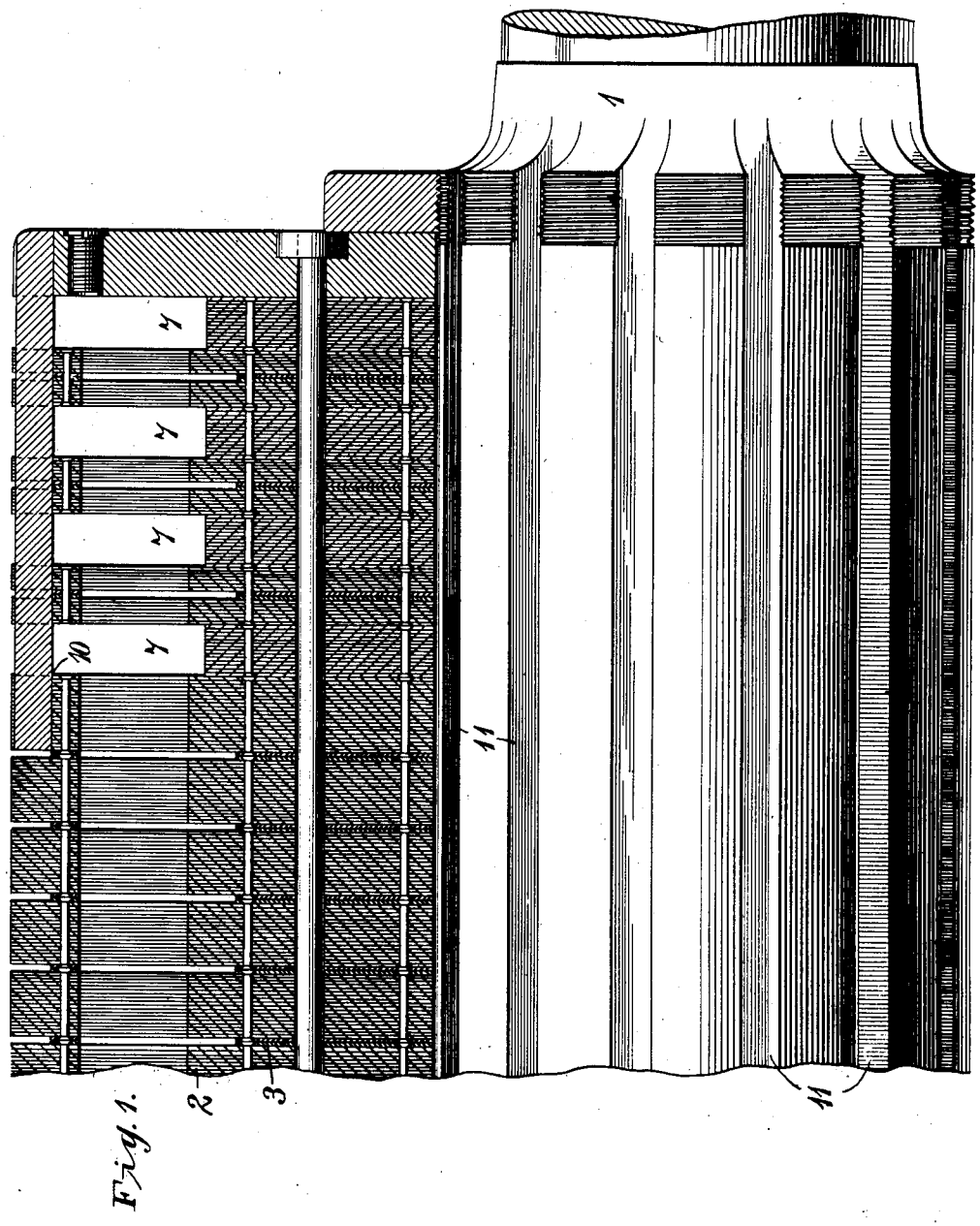
WITNESSES:
Fred H. Miller
R. J. Dearborn
INVENTOR
Albert Kingsbury
BY
Wesley G. Carr
ATTORNEY

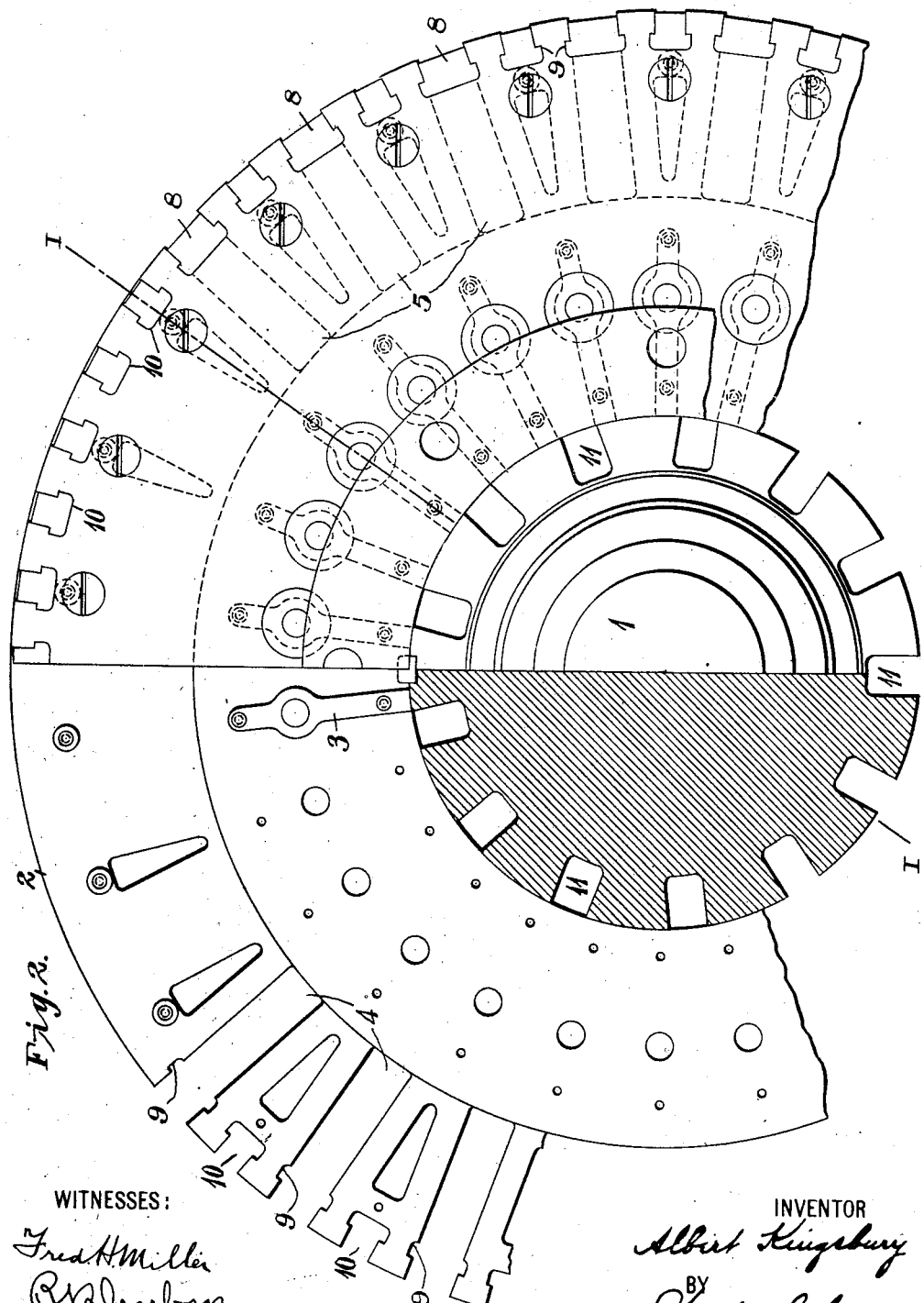

UNITED STATES PATENT OFFICE.

ALBERT KINGSBURY, OF PITTSBURG, PENNSYLVANIA, ASSIGNOR TO WESTINGHOUSE ELECTRIC & MANUFACTURING COMPANY, A CORPORATION OF PENNSYLVANIA.

VENTILATING MEANS FOR DYNAMO-ELECTRIC MACHINES.

959,550.

Specification of Letters Patent.   Patented May 31, 1910.

Application filed July 9, 1906. Serial No. 325,289.

*To all whom it may concern:*

Be it known that I, ALBERT KINGSBURY, a citizen of the United States, and a resident of Pittsburg, in the county of Allegheny and State of Pennsylvania, have invented a new and useful Improvement in Ventilating Means for Dynamo-Electric Machines, of which the following is a specification.

My invention relates to the ventilation of rotatable members of dynamo-electric machines, and has special reference to the ventilation of such laminated cylindrical core structures as are adapted for operation at high speeds.

In the construction of turbo-generators or other similar dynamo-electric machines which are operated at high speeds, the field magnet windings are usually located on the rotatable members which are sometimes solid steel castings suitably slotted to receive the windings. It is often desirable, however, to employ a laminated core structure, and, in machines of this type, the shafts upon which the cylindrical core members are assembled are relatively large, their diameters being approximately one-half as great as the outside diameters of the cylindrical core members with which they are used.

In order to ventilate the rotatable members, suitable spacing grids are inserted at intervals between laminæ, but the spaces thus formed may not safely be connected by longitudinal slots through the laminated structure near the shaft, by reason of the relatively small amount of material in the laminated structure and the high speeds at which it is operated. A reduction in the diameter of the shaft, in order to increase the depth of the laminated structure, is also impracticable because even a small reduction will materially weaken it.

In order to properly ventilate the structure and at the same time maintain proper proportions between the diameter of the shaft and the diameter of the core, I provide a plurality of longitudinal grooves in the shaft which insure circulation of air without appreciably weakening the shaft. The centrifugal action which accompanies the high speed operation of the machine creates a circulation of air from the shaft outwardly through the spaces between the laminæ, fresh air being supplied to the ends of the shaft through the longitudinal grooves.

In the accompanying drawings, Figure 1 is a sectional view in a longitudinal plane and on a line I—I of Fig. 2, of a portion of rotating field structure for dynamo-electric machines constructed in accordance with my invention, the shaft being shown in elevation, and Fig. 2 is an end elevation of the structure shown in Fig. 1, sections of the laminated core being broken away to disclose its structure.

Referring to the drawings, the structure illustrated therein comprises a substantially cylindrical shaft 1 and a plurality of magnetizable disks 2 that are assembled on the shaft. The disks 2 are separated at frequent intervals by ventilating plates or spacing grids 3 and the assembled structure is provided with two groups of longitudinal slots 4 and 5 which are disposed in radial planes and in which a magnetizing winding may be located. The slots comprised in the groups 4 and 5 do not extend to the ends of the core structure and are connected by circumferential slots 7. In this way, the magnetizing winding may be entirely embedded in and protected by the magnetizable structure.

In order to hold the winding securely in position when the machine is rotated at high speeds, keys or wedges 8, preferably of brass or other non-magnetizable material, are inserted in grooves or notches 9 near the openings in the slots. Relatively shallow longitudinal slots 10 are provided between the two groups 4 and 5 and across the circumferential slots 7 in which keys or wedges may be inserted. These slots extend only for a short distance from each end of the core structure and across the circumferential slots.

The shaft 1 is provided with a plurality of longitudinal grooves 11, which in no way interfere with the assembling of the cylindrical core structure and which permit a circulation of air from the ends of the shaft inward and radially outward through the spaces between the laminæ formed by the ventilating plates or spacing grids.

The grooved shaft of my invention may advantageously be utilized in connection with field or armature cores that are assembled from laminæ or are cast or forged into the desired form, and I desire that only such limitations be imposed as are indicated in the appended claims.

I claim as my invention:

1. A rotatable field magnet for dynamo-electric machines comprising a shaft having longitudinal grooves in its circumference, a plurality of magnetizable disks mounted on the shaft, ventilating plates located at intervals between the disks, two opposite groups of longitudinal slots near the surface of the laminated structure, and circumferential end slots which interconnect the two groups of longitudinal slots.

2. A rotatable field magnet for dynamo-electric machines comprising a shaft having longitudinal grooves in its circumference, a plurality of magnetizable disks mounted on the shaft, two opposite groups of longitudinal slots near the surface of the laminated structure, and circumferential end slots which interconnect the two groups of longitudinal slots, and non-magnetizable keys or wedges which are fitted into the openings of the longitudinal slots in the core structure.

3. A rotatable field magnet for dynamo-electric machines comprising a shaft having longitudinal grooves in its circumference, a plurality of magnetizable disks mounted on the shaft, ventilating plates located at intervals between the disks, two opposite groups of longitudinal slots near the surface of the laminated structure, circumferential end slots which interconnect the two groups of longitudinal slots, relatively shallow longitudinal slots between the two groups of longitudinal slots which extend only across the circumferential slots.

4. A rotating field magnet member for dynamo-electric machines comprising a substantially cylindrical shaft having longitudinal grooves in its surface, a plurality of magnetizable disks assembled thereon, having two diametrically opposite groups of longitudinal slots near the outer surface of the laminated cylinder, circumferential slots near its ends which connect the two groups of longitudinal slots, relatively shallow slots extending from the ends across the circumferential slots, similar grooves near the openings of all longitudinal slots, keys or wedges fitted into said grooves, and spacing grids or ventilating plates located at intervals between the disks.

In testimony whereof, I have hereunto subscribed my name this 30th day of June, 1906.

ALBERT KINGSBURY.

Witnesses:
R. J. DEARBORN,
BIRNEY HINES.